Dec. 10, 1940. N. WOROBJEFF 2,224,581
ELECTRIC GOVERNOR
Filed Dec. 13, 1938
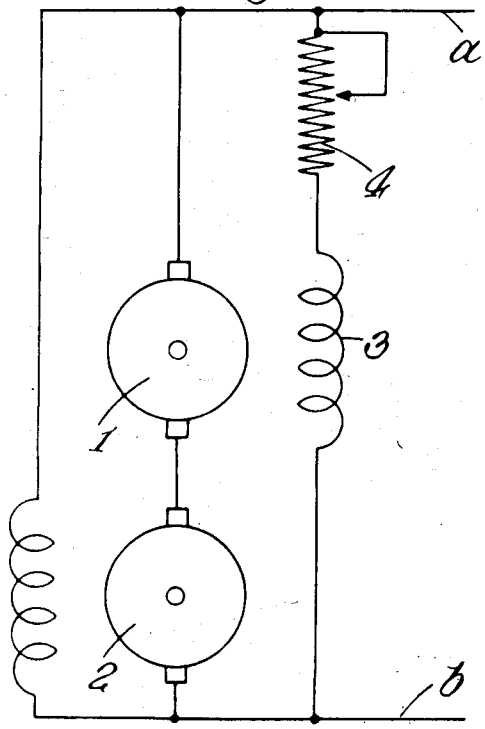
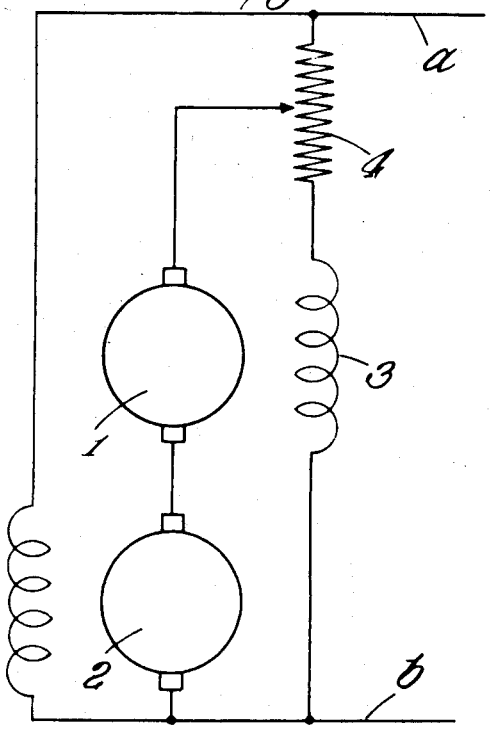
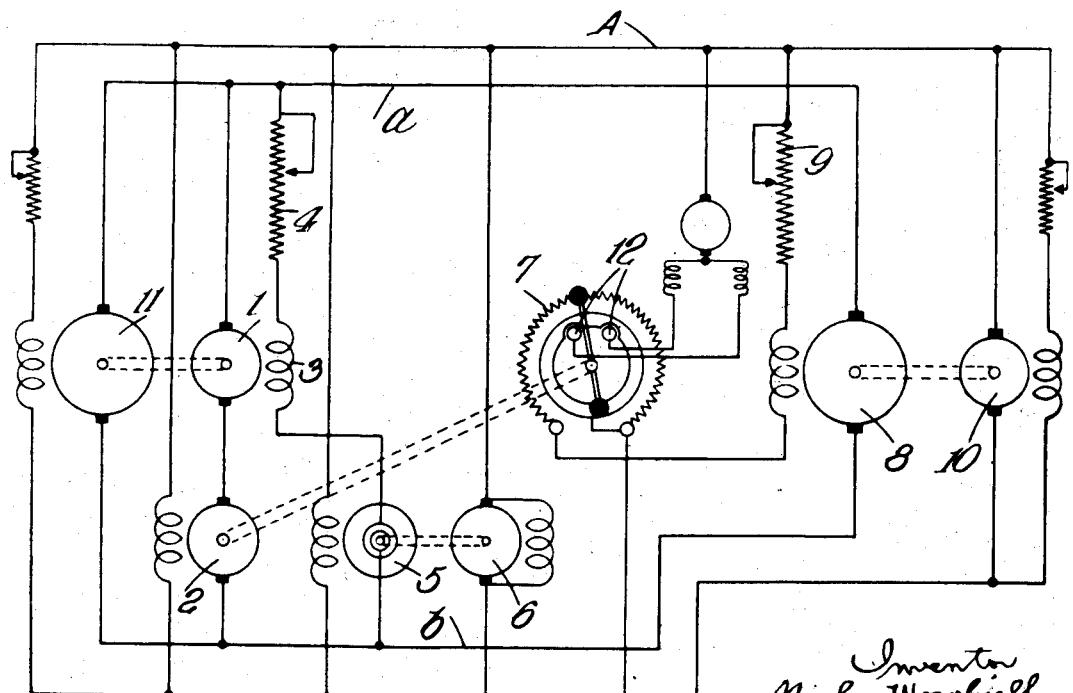

Patented Dec. 10, 1940

2,224,581

UNITED STATES PATENT OFFICE 2,224,581

ELECTRIC GOVERNOR

Nicolas Worobjeff, London, England, assignor to The Harland Engineering Company, Limited, London, England, a British company Application December 13, 1938, Serial No. 245,415
In Great Britain April 4, 1938

5 Claims. (Cl. 172—239)

This invention relates to electrical governors and has for an object an improved governor for automatically maintaining the speed of a machine constant within fine limits of accuracy independent of any variation in supply to the governor circuit and without the use of complicated or delicate apparatus.

A direct current supply is necessary for the operation of the improved governor and for this reason it is particularly suitable for controlling a direct current motor.

In accordance with the present invention the electric governor for automatically maintaining the speed of a machine or machines constant includes a direct current generator coupled to the machine to be governed and having a completely unsaturated field, so that its E. M. F. is proportional to the field current and at a certain speed of the generator balances the D. C. supply to which the field circuit is connected, which speed is independent of variations in the D. C. supply and a torque motor connected in series with the generator across the same supply and thus adapted to operate a regulator, e. g. a rheostat, a steam or fuel valve or the like, for the machine to be controlled in the event of any deviation of the machine to be governed from the speed at which the above mentioned balance takes place.

In accordance with a further feature of the invention a speed control rheostat of negligible temperature coefficient is connected in series with the generator field across the same supply to determine the speed at which the machine is governed.

At the correct speed of the machine the E. M. F. of the speed control generator balances the supply voltage and there is therefore no current through the torque motor. Should, however, the speed drop for some reason, then the E. M. F. also drops and current flows through the torque motor, which drives the regulator in a direction to increase the speed until balance is again obtained at the correct speed.

At a given setting of the speed control rheostat the governor is independent of variations in the supply voltage, as a drop in such voltage causes a proportionate drop in the field current of the speed control generator, and since the field system of this generator is completely unsaturated, it also causes a proportionate drop in the E. M. F.

The speed at which balance takes place is obviously inversely proportional to the field current and therefore directly proportional to the resistance in the speed control rheostat plus the resistance of the field winding. The speed can thus be adjusted by means of the speed control rheostat, in which the resistance material should have a negligible temperature coefficient.

In the application of the invention to the control of the speed of a paper machine which is driven by separately excited motors fed from a main generator the range in speed is obtained by variation of the main generator voltage which is automatically controlled by the governor in such a way that, for a given setting of the speed control rheostat, the speed of the paper machine remains constant independent of variations in load. The various sections of the machine are automatically maintained in a certain speed ratio with respect to one another by means of suitable speed interlocks, the duty of the governor being to keep the speed of the whole machine constant.

The invention is illustrated in the accompanying drawings in which Fig. 1 is a diagram illustrating the improved regulating means, Fig. 2 showing an alternative arrangement suitable where a large speed range is to be covered and Fig. 3 is a diagram showing the application of the invention to the control of a paper machine.

As shown in Fig. 1 a direct current generator 1 adapted to be coupled to the machine to be controlled has a completely unsaturated field winding 3 connected in series with a rheostat 4 across the direct current supply a, b. The armature of the direct current generator 1 is connected in series with the armature of a direct current torque motor 2 across the same supply a, b, the torque motor 2 being connected to a regulator or the like (not shown) through which the speed of the machine is controlled. At the correct speed of the machine to be controlled the E. M. F. of the speed control generator 1 balances the supply voltage and therefore no current passes through the torque motor 2. With any drop in speed of the member the speed of which is to be controlled the E. M. F. of the generator 1 also drops and current flows through the torque motor 2 driving the regulator in a direction to increase the speed until balance is again obtained at the correct speed.

The speed at which balance takes place is obviously inversely proportional to the field current and therefore directly proportional to the resistance in the speed control rheostat plus the resistance of the field winding 3. The speed can thus be adjusted by means of the speed control rheostat 4 in which the resistance material should have a negligible temperature coefficient.

In the arrangement shown in Fig. 2 the generator 1 is connected to the current supply a, b through the rheostat 4.

Referring now to Fig. 3 of the drawing which shows the application of the invention to the control of the speed of a paper machine the sections of which are driven by separately excited motors fed from a main generator the speed control generator 1 is coupled to one of the section motors 11 of the machine and its armature is connected in series with that of the torque motor 2 across circuit a, b supplied from the main generator 8. The field winding 3 of the speed control generator 1 is connected in series with the speed control rheostat 4 and also in series with the armature winding of a small low frequency alternator 5 across the same supply a, b. Both the torque motor 2 and the alternator 5 are excited from the circuit AB supplied from the main exciter 10. The alternator 5 is driven through reduction gearing by a small shunt wound direct current motor 6 fed from the supply AB.

The torque motor 2 drives a vernier rheostat 7 located in the field of the main generator 8 and thus controls the voltage of the latter in such manner that the speed of the particular section driven from the motor 11 is kept constant. When this vernier rheostat 7 approaches the end of its travel, limit switches 12 operate a main motor-operated regulator 9 in the field of the main generator 8 until the vernier rheostat 7 is again on its normal operating range.

The function of the low frequency alternator 5 is to cause the torque motor 2 to rock gently to and fro which has the effect of overcoming friction in the vernier rheostat 7 and the torque motor 2 itself, thus making the control much more sensitive.

I claim:

1. An electrical governor for automatically maintaining the speed of a machine constant including in combination with the machine, the speed of which is to be governed, a D. C. supply, a direct current generator connected to said D. C. supply and coupled to said machine, said generator having a completely unsaturated field circuit connected across said D. C. supply, so that its E. M. F. is proportional to the field current and at a certain speed of said generator balances said D. C. supply, said speed at which the above mentioned balance takes place being independent of variations in said D. C. supply, a torque motor connected in series with said generator across said D. C. supply and a regulator, for said machine to be controlled, operated by said torque motor in the event of any deviation of the machine to be governed from the speed at which the above mentioned balance takes place.

2. An electrical governor for automatically maintaining the speed of a machine constant including in combination with the machine, the speed of which is to be governed, a D. C. supply, a direct current generator connected to said D. C. supply and coupled to said machine, said generator having a completely unsaturated field circuit connected across said D. C. supply, so that its E. M. F. is proportional to the field current and at a certain speed of said generator balances said D. C. supply, said speed at which the above mentioned balance takes place being independent of variations in said D. C. supply, a torque motor connected in series with said generator across said D. C. supply and a rheostat, for said machine to be controlled, operated by said torque motor in the event of any deviation of the machine to be governed from the speed at which the above mentioned balance takes place.

3. An electrical governor for automatically maintaining the speed of machines constant including in combination with the machines, the speeds of which are to be governed, a D. C. supply, a direct current generator connected to said D. C. supply and coupled to said machines, said generator having a completely unsaturated field circuit connected across said D. C. supply, so that its E. M. F. is proportional to the field current and at a certain speed of said generator balances said D. C. supply, said speed at which the above mentioned balance takes place being independent of variations in said D. C. supply, a speed control rheostat of negligible temperature coefficient connected in series with the generator field across said D. C. supply, said speed control rheostat determining the speed at which the machines are governed, a torque motor connected in series with said generator across said D. C. supply and a regulator, for said machines to be controlled, operated by said torque motor in the event of any deviation of the machines to be governed from the speed at which the above mentioned balance takes place.

4. An electrical governor as claimed in claim 3 including a low frequency alternator connected in series with said generator field and arranged to cause said torque motor to rock to and fro and thereby increase the sensitivity of the governor.

5. An electrical governor for automatically maintaining the speed of a machine constant including in combination with the machine, the speed of which is to be governed, a D. C. supply, a direct current generator connected to said D. C. supply and coupled to said machine, said generator having a completely unsaturated field circuit connected across said D. C. supply, so that its E. M. F. is proportional to the field current and at a certain speed of said generator balances said D. C. supply, said speed at which the above mentioned balance takes place being independent of variations in said D. C. supply, a torque motor connected in series with said generator across said D. C. supply, a regulator, for said machine to be controlled, operated by said torque motor in the event of any deviation of the machine to be governed from the speed at which the above mentioned balance takes place, and a low frequency alternator connected in series with said generator field and arranged to cause said torque motor to rock to and fro and thereby increase the sensitivity of the governor.

NICOLAS WOROBJEFF.